US008212717B2

(12) United States Patent
Bruyere et al.

(10) Patent No.: US 8,212,717 B2
(45) Date of Patent: *Jul. 3, 2012

(54) RADAR IMAGING SYSTEM AND METHOD USING SECOND MOMENT SPATIAL VARIANCE

(75) Inventors: Donald P. Bruyere, Tucson, AZ (US); Ivan S. Ashcraft, Marana, AZ (US); John B. Treece, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1273 days.

This patent is subject to a terminal disclaimer.

(21) Appl. No.: 11/975,392

(22) Filed: Oct. 18, 2007

(65) Prior Publication Data

US 2010/0283667 A1 Nov. 11, 2010

Related U.S. Application Data

(60) Provisional application No. 60/854,776, filed on Oct. 26, 2006.

(51) Int. Cl.
*G01S 13/89* (2006.01)
*G01S 13/90* (2006.01)
*G01S 13/00* (2006.01)

(52) U.S. Cl. ............ 342/179; 342/25 R; 342/25 A; 342/89; 342/91; 342/93; 342/175; 342/176; 342/195

(58) Field of Classification Search ............ 342/21, 342/22, 25 R–25 F, 175, 176, 179, 192–197, 342/89–103, 159–164, 26 R–26 D, 70–72; 702/127, 189–199; 382/100, 107, 162, 165, 382/181, 190, 195, 201, 232, 236

See application file for complete search history.

(56) References Cited

U.S. PATENT DOCUMENTS

| 3,646,555 A | * | 2/1972 | Atlas | 342/26 R |
| 3,761,922 A | * | 9/1973 | Evans | 342/93 |
| 3,806,929 A | * | 4/1974 | Moore | 342/90 |

(Continued)

FOREIGN PATENT DOCUMENTS

WO WO-0114907 A1 3/2000

(Continued)

OTHER PUBLICATIONS

Introduction to Airborne Radar by G. W. Stimson, published 1998 by Scitech Pub Inc, pp. 527-549.

(Continued)

*Primary Examiner* — Bernarr Gregory
(74) *Attorney, Agent, or Firm* — Schwegman, Lundberg & Woessner, P.A.; Gregory J. Gorrie

(57) ABSTRACT

A detection system and method. The inventive system includes an arrangement for receiving a frame of image data; an arrangement for performing a variance calculation with respect to at least one pixel in the frame of image data; and an arrangement for comparing the calculated variance with a predetermined threshold to provide output data. In the illustrative embodiment, the frame of image data includes a range/Doppler matrix of N down range samples and M cross range samples. In this embodiment, the arrangement for performing a variance calculation includes an arrangement for calculating a variance over an N×M window within the range/Doppler matrix. The arrangement for performing a variance calculation includes an arrangement for identifying a change in a standard deviation of a small, localized sampling of cells. In accordance with the invention, the arrangement for performing a variance calculation outputs a variance pixel map.

13 Claims, 3 Drawing Sheets

U.S. PATENT DOCUMENTS

| | | | | |
|---|---|---|---|---|
| 4,031,364 | A * | 6/1977 | Wilmot | 342/159 |
| 4,074,264 | A * | 2/1978 | Wilmot | 342/90 |
| 4,318,100 | A * | 3/1982 | Shimizu et al. | 342/26 D |
| 4,489,319 | A * | 12/1984 | Hansen | 342/93 |
| 4,513,286 | A * | 4/1985 | Irabu | 342/93 |
| 4,600,925 | A * | 7/1986 | Alitz et al. | 342/26 B |
| 4,628,318 | A * | 12/1986 | Alitz | 342/26 D |
| 4,665,402 | A * | 5/1987 | Young | 342/91 |
| 4,970,660 | A * | 11/1990 | Marchant | 342/90 |
| 5,018,218 | A | 5/1991 | Peregrim et al. | |
| 5,243,663 | A | 9/1993 | Kudoh | |
| 5,390,133 | A * | 2/1995 | Sohie | 342/159 |
| 5,402,131 | A * | 3/1995 | Pierce | 342/194 |
| 5,430,445 | A | 7/1995 | Peregrim et al. | |
| 5,448,502 | A * | 9/1995 | Kindo et al. | 382/165 |
| 5,694,342 | A * | 12/1997 | Stein | 702/190 |
| 5,694,487 | A * | 12/1997 | Lee | 382/201 |
| 5,900,835 | A * | 5/1999 | Stein | 342/159 |
| 6,038,526 | A * | 3/2000 | Stein | 702/191 |
| 6,040,797 | A * | 3/2000 | Hofele | 342/159 |
| 6,094,160 | A * | 7/2000 | Lajiness | 342/70 |
| 6,137,439 | A * | 10/2000 | Bradford et al. | 342/159 |
| 6,229,475 | B1 * | 5/2001 | Woolley | 342/93 |
| 6,369,749 | B1 * | 4/2002 | Frey, Jr. | 342/93 |
| 6,377,206 | B1 * | 4/2002 | Petty | 342/159 |
| 6,389,084 | B1 * | 5/2002 | Rupp | 342/101 |
| 6,553,007 | B1 * | 4/2003 | Pekkarinen | 342/161 |
| 6,894,639 | B1 * | 5/2005 | Katz | 342/90 |
| 6,911,933 | B1 * | 6/2005 | Mutz et al. | 342/25 B |
| 6,924,763 | B2 * | 8/2005 | Poullin | 342/159 |
| 7,006,034 | B1 * | 2/2006 | Krikorian et al. | 342/159 |
| 7,035,456 | B2 | 4/2006 | Lestideau | |
| 7,362,378 | B2 | 4/2008 | Orlick | |
| 7,830,300 | B2 | 11/2010 | Bruyere et al. | |
| 2006/0147090 | A1 * | 7/2006 | Yang | 382/107 |
| 2010/0283668 | A1 | 11/2010 | Bruyere et al. | |

FOREIGN PATENT DOCUMENTS

WO     WO 01/14907 A     3/2001

OTHER PUBLICATIONS

"Application of angular correlation function of clutter scattering and correlation imaging in target detection", by G. Zhang, L. Tsang, IEEE Transactions on Geoscience and Remote Sensing, vol. 36, Issue 5, Part 1, pp. 1485-1493, Sep. 1998.

"U.S. Appl. No. 11/975,393, Non Final Office Action mailed Nov. 8, 2010", 8 pgs.

Novak, L M, et al., "An efficient multi-target SAR ATR Algorithm", Massachusetts Institute of Technology, Lincoln Labratory, Lexington MA.

Novak, L M, et al., "The Automatic target Recognition System in SAIP", Lincoln Labratory Journal vol. 10, No. 2, (1997), 187-203.

Sonka, M, et al., "Image Processing, Anaylsis, and machine Vision", Published PWS, (1998), 124-127, 646-660.

Stimson, G W, "Introduction to Airborne radar", Scitech Pub Inc, (1998), 527-549.

Zhang, G, et al., "Application of angular correlation function of clutter scattering and correlation imaging in target detection.", IEEE Transactions on Geoscience and Remote Sensing vol. 36 Issue 5 Part 1, (Sep. 1998), 1486-1493.

"U.S. Appl. No. 11/957,393, Final Office Action mailed Apr. 19, 2011", 6 pgs.

"U.S. Appl. No. 11/975,393, Response filed Feb. 3, 2011 to Non Final Office Action mailed Nov. 8, 2010", 8 pgs.

"U.S. Appl. No. 11/975,393, Response filed Jun. 13, 2011 to Advisory Action mailed Jun. 9, 2011 and Final Office Action mailed Apr. 19, 2011", 6 pgs.

"U.S. Appl. No. 11/975,393, Response filed May 26, 2011 to Final Office Action mailed Apr. 19, 2011", 6 pgs.

"U.S. Appl. No., 11/975,393, Advisory Action mailed Jun. 9, 2011", 3 pgs.

"U.S. Appl. No. 11/975,393, Advisory Action mailed Jul. 8, 2011", 3 pgs.

"U.S. Appl. No. 11/975,393, Notice of Allowance mailed Jul. 29, 2011", 7 pgs.

"U.S. Appl. No. 11/975,393, Response filed Jul. 12, 2011 to Advisory Action mailed Jul. 8, 2011", 4 pgs.

"European Application Serial No. 07254239.2, Examination Notification mailed Apr. 15, 2011", 5 pgs.

"European Application Serial No. 07254239.2, Office Action mailed Apr. 15, 2011", 6 pgs.

Pham, Quoc, et al., "Multistage algorithm for detection of targets in SAR image data", Proc. SPIE, 3070, (1997), 66-75.

* cited by examiner

RADAR IMAGING SYSTEM AND METHOD USING SECOND MOMENT SPATIAL VARIANCE

REFERENCE TO COPENDING APPLICATIONS

This application claims the benefit of United States Provisional Application No. 60/854,776, filed Oct. 26, 2006, the disclosure of which is hereby incorporated by reference. In addition, copending patent applications entitled RADAR IMAGING SYSTEM AND METHOD USING DIRECTIONAL GRADIENT MAGNITUDE SECOND MOMENT SPATIAL VARIANCE DETECTION and RADAR IMAGING SYSTEM AND METHOD USING GRADIENT MAGNITUDE SECOND MOMENT SPATIAL VARIANCE DETECTION, both filed Oct. 18, 2007 by D. P. Bruyere et al., Ser. Nos. 11/975,391, now U.S Pat. No. 7,830,300, and 11/975,393, now U.S. Pat. No. 8,054,217, involve second moment gradient magnitude detection and directional gradient second moment detection, respectively, the teachings of which are hereby incorporated herein by reference.

BACKGROUND OF THE INVENTION

1. Field of the Invention

The present invention relates to radar systems and associated methods. More specifically, the present invention relates to systems and methods for improving radar image quality.

2. Description of the Related Art

Synthetic Aperture Radar (SAR) uses a side looking radar aperture on a moving platform to provide high-resolution imagery over a broad area. The concept usually employs airborne radar that collects data while flying some distance, and then processes the data coherently as if it came from a physically long antenna. (See *Introduction to Airborne Radar* by G. W. Stimson, published 1998 by Scitech Pub Inc, pp. 527-549.)

This synthetically long antenna aperture provides superior image resolution over that of the actual antenna and overcomes the weather dependent nature of all optical remote-sensing systems. While the ability of SAR radars to produce better and better imagery advances, the ability of those same radars to autonomously distinguish stationary ground vehicles from background clutter remains difficult.

Template based methods use previously collected images from known vehicles to identify targets within a scene. (See "The Automatic Target-Recognition System in SAIP", by L. M. Novak, et al., Lincoln Laboratory Journal, vol. 10, no. 2, pp 187-203, 1997 and "An efficient multi-target SAR ATR Algorithm", by L. M. Novak, et al., published by the Massachusetts Institute of Technology/Lincoln Laboratory, Lexington, Mass.)

The process of template based target identification begins with a simple localized constant false alarm rate (CFAR) detection test to remove any objects that are not locally bright, then a discrimination layer is applied that removes any non-target like objects. These two layers of processing are performed before the template processing is applied, since the template based processing can be easily overwhelmed with a high false alarm rate.

Another problem of template based target identification is that its performance is based on prior knowledge of the target. The total number of different target types that need to be identified also affects performance. One drawback of template based target detection methods is that small variations in target configurations can reduce the effectiveness of the templates.

Also, since a SAR image contains many small scatters whose physical size is on the order of the radar's wavelength, constructive and destructive interference of the complex returns produces phenomena called speckle, which reduces image quality and decreases probability of target detection. Smoothing and spatial filtering techniques can reduce speckle and help increase the probability of detection. (See "Application of angular correlation function of clutter scattering and correlation imaging in target detection", by G. Zhang, L. Tsang, *IEEE Transactions on Geoscience and Remote Sensing*, Volume 36, Issue 5, Part 1, pp. 1485-1493, September 1998.) However, these approaches remain inadequate for current more demanding applications.

Hence, a need remains in the art for an improved radar system or method for imaging a target that addresses problems associated with speckle.

SUMMARY OF THE INVENTION

The need in the art is addressed by the detection system and method of the present invention. The inventive detection system includes means for receiving a frame of image data; means for performing a variance calculation with respect to at least one pixel in the frame of image data; and means for comparing the calculated variance with a predetermined threshold to provide output data. In the illustrative embodiment, the frame of image data includes a range/Doppler matrix of N down range samples and M cross range samples. In this embodiment, the means for performing a variance calculation includes means for calculating a variance over an N×M window within the range/Doppler matrix. The means for performing a variance calculation includes means for identifying a change in a standard deviation of a small, localized sampling of cells. The means for performing a variance calculation outputs a variance pixel map.

DESCRIPTION OF THE INVENTION

Figure 1:
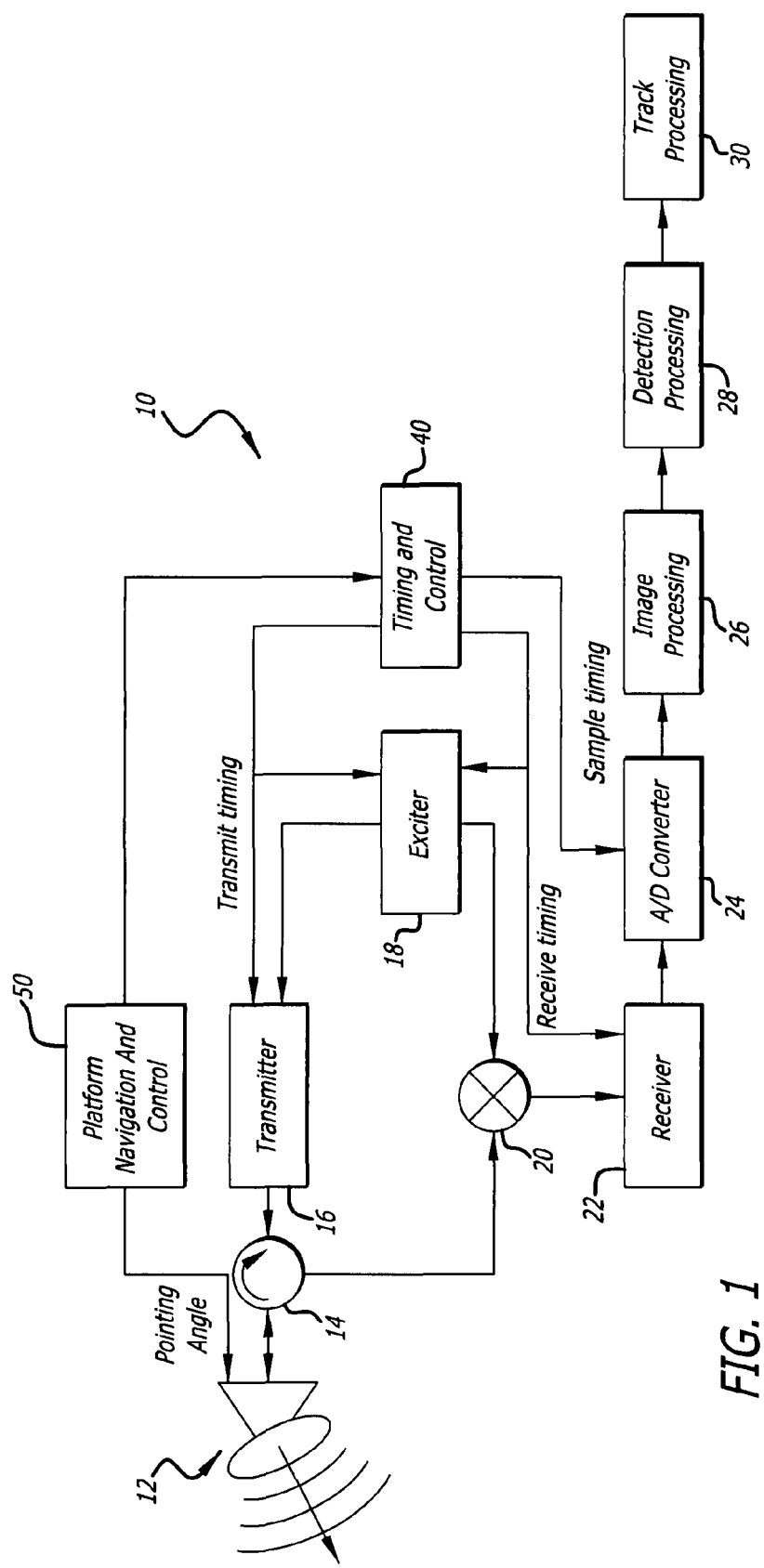
FIG. 1 is a block diagram of an illustrative embodiment of an imaging radar system implemented in accordance with the present teachings.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention exploits a recognition that for complex targets viewed from airborne radar, a high degree of scene variance can provide better detection of a fluctuating target than amplitude based detection methods. This alternative method of distinguishing targets from background is presented that can be used instead of, or in conjunction with the template based processing techniques previously discussed.

Most scene based detection methods use amplitude as a means of identifying a target within the scene. Man-made targets generally have a high Radar Cross Section (RCS) that can make them brighter than the surrounding clutter. Factors that contribute to RCS include the physical size of target, the number of reflective surfaces, angles of the reflective surfaces, and the reflective properties of the material from which the target is made. However, even if a target has a large RCS, there is no guarantee that reflective characteristics alone will distinguish the target from other bright objects within the scene. Some natural backgrounds, such as snow that has been partially melted and refrozen, are highly reflective and can generate large radar returns that easily overshadow the returns from most man-made target types. SAR images of man-made targets have inherent characteristics that can be exploited to enhance detection of these targets. The multi-facetted, sometimes specular surfaces that land or air vehicles have, as do some buildings, help to distinguish them from normal background features such as grassy fields, roads, and trees.

Most man-made vehicles are made up of many small dihedral corner reflectors. The constructive and destructive nature of these target returns manifests itself in a SAR image as a high variation of signal amplitudes within a very localized area. This invention exploits the fact that these highly reflective, multifaceted features build constructively and fade in localized regions within the scene. These rapidly changing returns manifest themselves as a high degree of local scene variance, which can be measured by calculating the variance of a small group of pixels within a SAR scene. By using local scene variance as a distinguishing factor, enhanced detection of these target types over a variety of background types and conditions may be achieved. The associated image created from the localized variance calculations is referred to as either a variance or standard deviation image.

The present invention exploits inherent characteristics associated with most target types to improve detection with SAR images. The present invention involves second moment detection. Copending patent applications entitled RADAR IMAGING SYSTEM AND METHOD USING DIRECTIONAL GRADIENT MAGNITUDE SECOND MOMENT SPATIAL VARIANCE DETECTION and RADAR IMAGING SYSTEM AND METHOD USING GRADIENT MAGNITUDE SECOND MOMENT SPATIAL VARIANCE DETECTION, both filed Oct. 18, 2007 by D. P. Bruyere et al., Ser. Nos. 11/975,391, now U.S. Pat. No. 7,830,300, and 11/975,393, now U.S. Pat. No. 8,054,217, involve second moment gradient magnitude detection and directional gradient second moment detection, respectively, the teachings of which are hereby incorporated herein by reference.

The invention operates on complex SAR images, where each pixel represents the signal amplitude received at a particular down range and cross range location relative to the aircraft. The dimension within a SAR scene that is parallel to the radar platform's line of sight vector is referred to as the down range direction. Perpendicular to the down range direction and parallel to the aircraft's velocity vector is the cross range dimension. Nonetheless, those of ordinary skill in the art will appreciate that the present invention is not limited thereto. The present teachings may be applied to images generated by other means without departing from the scope thereof.

In accordance with the present teachings, a second moment image is derived from an input (e.g. SAR) image. As discussed more fully below, each pixel of the second moment image represents the local standard deviation of pixel amplitudes from a small region in the original SAR image. A bright pixel in the second moment image represents an area with a high degree of local scene variance within the original scene. Alternatively, dark pixels represent a very low degree of local variance.

Second Moment Generalized Likelihood Ratio Test

To develop a generalized likelihood ratio test, assume that the distribution of the scene data is complex Gaussian whether there is a target present or not. The mean and standard deviations of the respective distributions are unknown and assumed to be different under each hypothesis. By collecting a small sample of range Doppler cells about the cell under test, we assume that we can determine whether the statistics implied by the sample cells indicate that the samples are from target cells or background cells. This controls the size of the sample that we select, since it has to be smaller than the target of interest.

The likelihood ratio test thus begins with a small matrix of pixels, X, that is made up of N down range samples by M cross range samples. This presumes a square sample area for convenience of the derivation. We will assume measurements to be independent from one pixel to the next, so the joint probability distribution under the target present is the product of the probability density functions (pdf's) associated with each individual measurement. For a small region of SAR pixels under test the target present and target absent hypothesis probability distributions are:

$$p(X; \theta_1 / H_1) = \prod_{n=-N/2}^{N/2} \prod_{m=-M/2}^{M/2} \frac{1}{(\pi \sigma_{H_1}^2)} e^{\left(\frac{-(x[n,m]-A_1)^H(x[n,m]-A_1)}{\sigma_{H_1}^2}\right)} = \quad (0.1)$$

$$\frac{1}{(\pi \sigma_{H_1}^2)^{NM}} \exp\left(\frac{-\sum_{n=-N/2}^{N/2}\sum_{m=-M/2}^{M/2}(x[n,m]-A_1)^H(x[n,m]-A_1)}{\sigma_{H_1}^2}\right)$$

and $$p(X; \theta_0 / H_0) = \prod_{n=-N/2}^{N/2} \prod_{m=-M/2}^{M/2} \frac{1}{(\pi \sigma_{H_0}^2)} e^{\left(\frac{-(x[n,m]-A_0)^H(x[n,m]-A_0)}{\sigma_{H_0}^2}\right)} = \quad (0.2)$$

$$\frac{1}{(\pi \sigma_{H_0}^2)^{NM}} \exp\left(\frac{-\sum_{n=-N/2}^{N/2}\sum_{m=-M/2}^{M/2}(x[n,m]-A_0)^H(x[n,m]-A_0)}{\sigma_{H_0}^2}\right)$$

respectively, where x[n,m] is an individual pixel that is located at n down range and m cross range. The probability distribution functions are parameterized by unknown variables $$\theta_1 \Rightarrow \begin{bmatrix} A_1 \\ \sigma_{H_1}^2 \end{bmatrix} \quad (0.3)$$

$$\theta_0 \Rightarrow \begin{bmatrix} A_0 \\ \sigma_{H_0}^2 \end{bmatrix}$$

where $A_1$ and $\sigma_{H1}$, are the mean and the standard deviation of the target present hypothesis, and $A_0$ and $\sigma_{H0}$ are the mean and the standard deviation of the target present hypothesis. Given this, the likelihood ratio test begins as:

$$\Lambda = \frac{p\left(X; \frac{\theta_1}{H_1}\right)}{p\left(X; \frac{\theta_0}{H_0}\right)} = \tag{0.4}$$

$$\frac{\frac{1}{(\pi\sigma_{H_1}^2)^{NM}} \exp\left(\frac{-\sum_{n=-N/2}^{N/2} \sum_{m=-M/2}^{M/2} (x[n,m]-A_1)^H (x[n,m]-A_1)}{\sigma_{H_1}^2}\right)}{\frac{1}{(\pi\sigma_{H_0}^2)^{NM}} \exp\left(\frac{-\sum_{n=-N/2}^{N/2} \sum_{m=-M/2}^{M/2} (x[n,m]-A_0)^H (x[n,m]-A_0)}{\sigma_{H_0}^2}\right)} \begin{array}{l} > \text{Threshold} \to H1 \\ < \text{Threshold} \to H0 \end{array}.$$

In order to solve for the unknown means and standard deviations, we must maximize the target present hypothesis (0.1) with respect to the unknowns in (0.3). We start by maximizing the expression with respect to the unknown amplitude: $A_1$. Taking the natural log of both sides of the equation, we get an expression that is easier to work with $$\ln[p(X; \theta_1/H_1)] = \ln\left(\frac{1}{(\pi\sigma_{H_1}^2)^{NM}}\right) - \frac{\sum_{n=-N/2}^{N/2} \sum_{m=-M/2}^{M/2} (x[n,m]-A_1)^H (x[n,m]-A_1)}{\sigma_{H_1}^2}. \tag{0.5}$$

Taking the derivative of (0.5) with respect to $A_1$, gives us:

$$\frac{\partial \ln[p(X; \theta_1/H_1)]}{\partial A_1} = \frac{\partial}{\partial A_1}\left[\ln\left(\frac{1}{(\pi\sigma_{H_1}^2)^{NM}}\right) - \frac{\sum_{n=-N/2}^{N/2} \sum_{m=-M/2}^{M/2} (x[n,m]-A_1)^H (x[n,m]-A_1)}{\sigma_{H_1}^2}\right] \tag{0.6}$$

$$= 2\frac{\sum_{n=-N/2}^{N/2} \sum_{m=-M/2}^{M/2} (x[n,m]-A_1)}{\sigma_{H_1}^2}.$$

Setting this expression equal to zero and solving for the unknown mean value for the target present hypothesis gives, us the maximum likelihood estimate (MLE):

$$\hat{A}_1 = \frac{1}{NM} \sum_{n=-N/2}^{N/2} \sum_{m=-M/2}^{M/2} (x[n,m]) \tag{0.7}$$

We can take a similar approach to obtain a maximum likelihood estimate of the unknown standard deviation. Taking the derivative of the log with respect to $\sigma_{H1}^2$ gives us the following expression $$\frac{\partial \ln[p(X; \theta_1/H_1)]}{\partial \sigma_{H_1}^2} = \frac{\partial}{\partial \sigma_{H_1}^2}\left[\ln\left(\frac{1}{(\pi\sigma_{H_1}^2)^{NM}}\right) - \frac{\sum_{n=-N/2}^{N/2} \sum_{m=-M/2}^{M/2} (x[n,m]-A_1)^H (x[n,m]-A_1)}{\sigma_{H_1}^2}\right] \tag{0.8}$$

$$= -\frac{NM}{(\sigma_{H_1}^2)} + \frac{\sum_{n=-N/2}^{N/2} \sum_{m=-M/2}^{M/2} (x[n,m]-A_1)^H (x[n,m]-A_1)}{\sigma_{H_1}^4}.$$

Since we have concluded that $\hat{A}_1$, is the MLE for the unknown target present hypothesis mean, we can substitute it in for $A_1$, and set the expression equal to zero to solve for the unknown variance term:

$$\hat{\sigma}_{H_1}^2 \frac{1}{NM} \sum_{n=-N/2}^{N/2} \sum_{m=-M/2}^{M/2} (x[n,m]-\hat{A}_1)^H (x[n,m]-\hat{A}_1). \tag{0.9}$$

Understanding that we have similar unknowns under the target absent hypothesis, represented in (0.3), we can proceed in a similar manner to find their respective MLE's starting with the $H_0$ probability density function in (0.2) and get similar results for the target absent hypothesis:

$$\hat{A}_0 = \frac{1}{NM} \sum_{n=-N/2}^{N/2} \sum_{m=-M/2}^{M/2} (x[n,m]) \tag{0.10}$$

$$\hat{\sigma}_{H_0}^2 = \frac{1}{NM} \sum_{n=-N/2}^{N/2} \sum_{m=-M/2}^{M/2} (x[n,m]-\hat{A}_0)^H (x[n,m]-\hat{A}_0)$$

Substituting all of the maximum likelihood estimates in for their unknown counterparts and simplifying, we get an expression for the generalized likelihood ratio test for a synthetic aperture scene:

$$GLRT = \frac{p\left(X; \frac{\theta_1}{H_1}\right)}{p\left(X; \frac{\theta_0}{H_0}\right)} = \frac{\frac{1}{\left(2\pi\hat{\sigma}^2_{H_1}\right)^{\frac{NM}{2}}}\exp\left(\frac{-\sum_{n=-N/2}^{N/2}\sum_{m=-M/2}^{M/2}(x[n,m]-\hat{A}_1)^H(x[n,m]-\hat{A}_1)}{2\hat{\sigma}^2_{H_1}}\right)}{\frac{1}{\left(2\pi\hat{\sigma}^2_{H_0}\right)^{\frac{NM}{2}}}\exp\left(\frac{-\sum_{n=-N/2}^{N/2}\sum_{m=-M/2}^{M/2}(x[n,m]-\hat{A}_0)^H(x[n,m]-\hat{A}_0)}{2\hat{\sigma}^2_{H_0}}\right)}$$ (0.11)

$$GLRT = \frac{\frac{1}{\left(2\pi\hat{\sigma}^2_{H_1}\right)^{\frac{NM}{2}}}}{\frac{1}{\left(2\pi\hat{\sigma}^2_{H_0}\right)^{\frac{NM}{2}}}} = \frac{\left(2\pi\hat{\sigma}^2_{H_0}\right)^{\frac{NM}{2}}}{\left(2\pi\hat{\sigma}^2_{H_1}\right)^{\frac{NM}{2}}} = \left(\frac{\hat{\sigma}^2_{H_0}}{\hat{\sigma}^2_{H_1}}\right)^{\frac{NM}{2}}.$$

The most significant factor of the resultant expression indicates that we can set a threshold that depends strictly on the variance of the local statistics, regardless of the mean value of the local statistics. Therefore, the second moment detector looks for a change in standard deviation of a small, localized sampling of cells. This assumes that the target image has different second order statistics than the background, but places no constraint on the overall amplitude of the target with respect to the background. Implied in this assumption is the fact that the size of the sample window needs to be smaller than the anticipated size of the target within the scene, but large enough to get a relative feel for the local second order statistical properties. If the size of the sample area is too small, then the sampled statistics are not representative of the actual second order properties associated with the area under test.

However, if the size of the sample area is too large, then the sample may be overlapping several parts of the scene with the resultant sample statistics not representing any one part of the scene, but instead, combining sample statistics from different details within the scene. It is for this reason that sufficient SAR resolution must be available to choose a sample area large enough to get a reasonable feel for the local statistics, but smaller than the smallest target size of interest.

FIG. 1 is a block diagram of an illustrative embodiment of an imaging radar system implemented in accordance with the present teachings. As shown in FIG. 1, the system 10 includes a SAR antenna 12 coupled to a circulator 14. As is common in the art, the circulator 14 couples energy to the antenna 12 from a transmitter 16 in response to an exciter 18. The circulator 14 also couples energy from the antenna 12 to a receiver 22 via a multiplexer 20. The receiver 22 down converts the received SAR signals and provides a baseband output to an analog to digital converter 24. The A/D converter 24 outputs digital data to image processing, detection processing and track processing modules 26, 28 and 30 respectively. In the best mode, the modules 26, 28 and 30 are implemented in software. Transmit, receive and A/D timing and system control is provided by a conventional clock and control processor 40 in response to signals from a platform navigation and control system 50. The platform navigation and control system 50 also provides pointing angle control to the antenna 12 as is common in the art.

As discussed more fully below, the present invention is implemented within the detection-processing module 28 of FIG. 1. Detection processing is illustrated in the flow diagram of FIG. 2.

Figure 2:
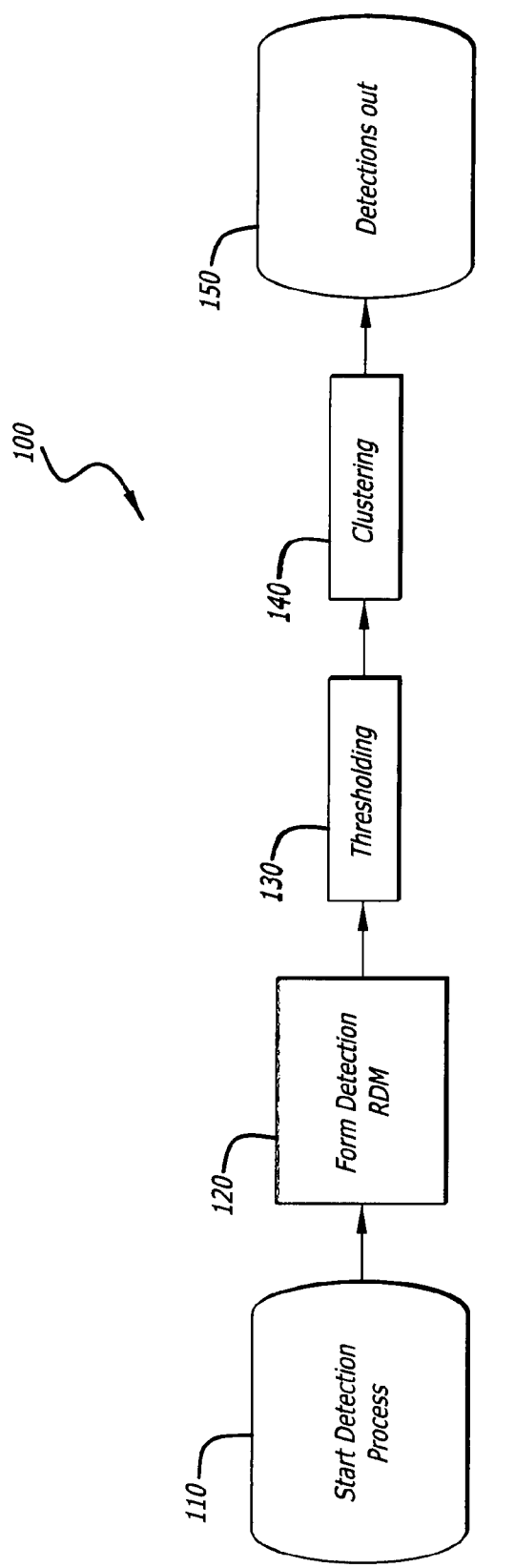
FIG. 2 is a flow diagram of an illustrative embodiment of a method for detection processing in accordance with the present teachings.

FIG. 2 is a flow diagram of an illustrative embodiment of a method for detection processing in accordance with the present teachings. As illustrated in FIG. 2, the illustrative method 100 begins with an initiation step 110 after which at step 120 a detection Range/Doppler Matrix (RDM) is formed. At step 130 the RDM is thresholded and at step 140 the thresholded RDMs are clustered. Finally, at step 150, the detected spatial variances are output.

Figure 3:
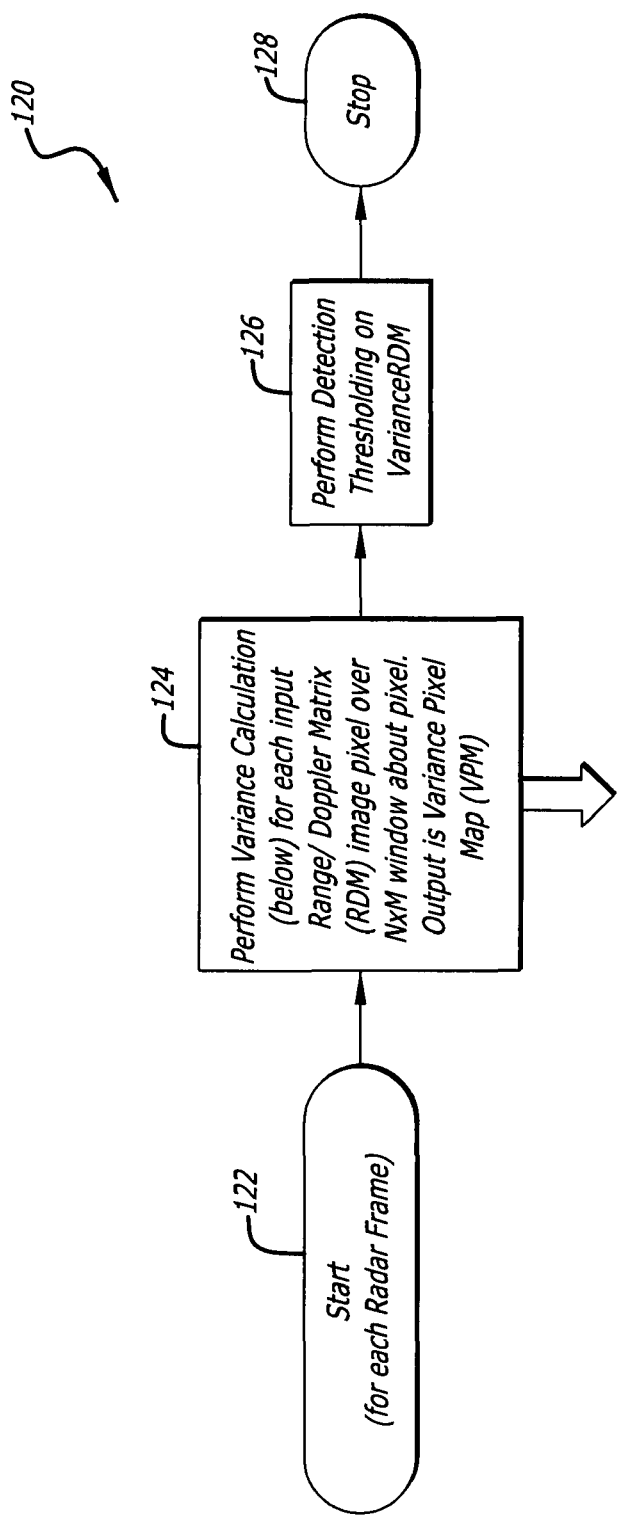
FIG. 3 is a flow diagram of an illustrative embodiment of a method for second moment detection processing in accordance with the present teachings.

FIG. 3 is a flow diagram of an illustrative embodiment of a method for second moment detection processing in accordance with the present teachings. The method 120 includes an initiation step 122 for each frame of radar image data. Next, at step 124, a variance is calculated for each range-doppler matrix (RDM) pixel over an RDM matrix. The RDM matrix is a two dimensional m×n array of received radar returns indexed by range in one dimension and Doppler in the other dimension, where m and n are integers indicating the size of a window used to calculate localized variance within a scene.

In a radar imaging system application, the range index of an RDM corresponds to the distance from the imaging platform and the Doppler index corresponds to the return location measured along the flight path of the radar. In a broad side radar configuration, these range and Doppler dimensions are orthogonal.

At step 126, detection thresholding is performed on the variance/RDM.

At step 128, the algorithm outputs a set of two-dimensional vectors pointing to those RDM locations that had a variance larger than the predetermined threshold. The output is a 2×K detections matrix that describes the locations of threshold crossings within the RDM, where K is the number of threshold crossings.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A detection system comprising a detection processor configured to:
receive a frame of image data that includes a range/Doppler matrix;
perform a variance calculation with respect to at least one pixel in said frame of image data;
generate output data based on a comparison of said calculated variance with a predetermined threshold; and
process the output data for target detection.

2. The detection system of claim 1 wherein said range/Doppler matrix includes N down range samples and M cross range samples.

3. The detection system of claim 1 wherein the detection processor is further configured to calculate a variance over an N×M window within said range/Doppler matrix.

4. The detection system of claim 3 wherein the detection processor is further configured to output a variance pixel map.

5. A detection system comprising a detection processor configured to:
receive a frame of image data;

perform a variance calculation with respect to at least one pixel in said frame of image data;
generate output data based on a comparison of said calculated variance with a predetermined thresholds;
process the output data for target detection; and
identify a change in a standard deviation of a small, localized sampling of cells.

6. A radar system comprising:
a radar antenna;
a transmitter;
a receiver;
circulator means for coupling said transmitter and receiver to said antenna;
an image processor coupled to said receiver; and
a detection processor coupled to said image processor, said detection processor having:
software for receiving a frame of image data;
software for performing a variance calculation with respect to at least one pixel in said frame of image data; and
software for comparing said calculated variance with a predetermined threshold to provide output data.

7. The radar system of claim 6 wherein said frame of image data includes a range/Doppler matrix.

8. The radar system of claim 7 wherein said range/Doppler matrix includes N down range samples and M cross range samples.

9. The radar system of claim 7 wherein said software for performing a variance calculation includes software for calculating a variance over an N×M window within said range/Doppler matrix.

10. The radar system of claim 9 wherein said software for performing a variance calculation outputs a variance pixel map.

11. The radar system of claim 6 wherein said software for performing a variance calculation includes software for identifying a change in a standard deviation of a small, localized sampling of cells.

12. The radar system of claim 6 further including a track processor.

13. A detection method performed by a detection system comprising a detection processor, the method comprising:
receiving a frame of image data that includes a range/Doppler matrix;
performing a variance calculation with respect to at least one pixel in said frame of image data;
comparing said calculated variance with a predetermined threshold;
generating output data based on the comparison of the calculated variance with the predetermined threshold; and
processing the output data for target detection.

* * * * *